(12) United States Patent
Evans et al.

(10) Patent No.: US 11,107,286 B2
(45) Date of Patent: Aug. 31, 2021

(54) SYNCHRONIZED EFFECTS FOR MULTI-USER MIXED REALITY EXPERIENCES

(71) Applicant: Disney Enterprises, Inc., Burbank, CA (US)

(72) Inventors: Leslie Evans, La Crescenta, CA (US); Nicholas Newberg, Los Angeles, CA (US); Alexis P. Wieland, Glendale, CA (US); Clare M. Carroll, Pasadena, CA (US); Joseph G. Hager, IV, Valencia, CA (US); Siroberto Scerbo, Montrose, CA (US); Jonathan Becker, Carson, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/582,070

(22) Filed: Sep. 25, 2019

(65) Prior Publication Data

US 2021/0090334 A1    Mar. 25, 2021

(51) Int. Cl.
*G06T 19/00* (2011.01)
*G06F 3/0481* (2013.01)
*G02B 27/01* (2006.01)
*G08B 6/00* (2006.01)
*G06F 3/01* (2006.01)

(52) U.S. Cl.
CPC .......... *G06T 19/006* (2013.01); *G02B 27/017* (2013.01); *G06F 3/011* (2013.01); *G06F 3/04815* (2013.01); *G08B 6/00* (2013.01)

(58) Field of Classification Search
None
See application file for complete search history.

(56) References Cited

U.S. PATENT DOCUMENTS 8,659,658 B2 *   2/2014  Vassigh ................. G06T 7/251
                                                    348/143
10,019,846 B1 *  7/2018  York ..................... G06F 3/0304
(Continued)

OTHER PUBLICATIONS

Sluganovic et al, 'HoloPair: Securing Shared Augmented Reality Using Microsoft HoloLens', ACSAC'17, pp. 250-261. (Year: 2017).*

(Continued)

*Primary Examiner* — Patrick F Valdez
(74) *Attorney, Agent, or Firm* — Farjami & Farjami LLP

(57) ABSTRACT

There are provided systems and methods for synchronizing effects for multi-user mixed reality experiences. In one implementation, such a system includes a computing platform having a hardware processor and a system memory storing a software code. The hardware processor executes the software code to receive sensor data from multiple sensors within a venue, identify an activity in the venue based on the sensor data, and track a respective perspective and a respective location within the venue of each of multiple observers of the activity. The hardware processor also executes the software code to identify a first effect triggered by an action of one of the observers, conform the first effect to the respective perspective and the respective location of each of the observers to produce multiple second effects corresponding to the first effect, and output the second effects for operating multiple actuating devices within the venue during the activity.

20 Claims, 7 Drawing Sheets

(56) References Cited

U.S. PATENT DOCUMENTS

| | | | | |
|---|---|---|---|---|
| 10,721,280 | B1* | 7/2020 | Heppner | G06F 3/04883 |
| 2016/0093108 | A1* | 3/2016 | Mao | A63F 13/825 |
| | | | | 345/633 |
| 2016/0104452 | A1* | 4/2016 | Guan | A63F 13/35 |
| | | | | 345/633 |
| 2016/0234662 | A1* | 8/2016 | Heubel | H04W 56/00 |
| 2017/0032630 | A1* | 2/2017 | Gervais | G08B 6/00 |
| 2018/0027520 | A1* | 1/2018 | Levesque | H04W 4/023 |
| | | | | 455/412.2 |
| 2018/0077646 | A1* | 3/2018 | Moran-Cirkovic | |
| | | | | H04L 12/2838 |
| 2019/0005723 | A1* | 1/2019 | Denman | G06F 1/12 |
| 2020/0404079 | A1* | 12/2020 | Yerli | H04W 4/20 |

OTHER PUBLICATIONS

Mattern et al, 'From the Internet of Computers to the Internet of Things', In From active data management to event-based systems and more, pp. 242-259, Springer, Berlin, Heidelberg. (Year: 2010).*

Matsuzono et al, 'HaptI/O: Physical Node for the Internet of Haptics', UIST'17 Adjunct, pp. 53-55. (Year: 2017).*

* cited by examiner

SYNCHRONIZED EFFECTS FOR MULTI-USER MIXED REALITY EXPERIENCES

BACKGROUND

Mixed reality involves the merging of real and virtual components in a physical space such that digital and physical objects co-exist and interact. Conventional mixed reality experiences are typically directed at a single participant viewing the mixed reality environment from a single perspective. Moreover, conventional mixed reality experiences according to the present state-of-the-art may omit or severely limit object-to-object interactions. For example, virtual light emitted from a virtual object typically may not suffuse adjacent physical objects with light as natural light in a real environment would. Such omissions and simplifications in existing implementations lower computing and rendering complexity, but create a much less interesting user experience.

By contrast, when multiple participants utilize a shared mixed reality environment concurrently, the complexity of computing and rendering the mixed reality components from multiple points of view increases exponentially. In addition, as object-to-object interactions are added to a multi-user mixed reality environment, the computational and rendering complexity is increased to a level to which conventional mixed reality implementations are simply incapable of scaling.

SUMMARY

There are provided systems and methods for synchronizing effects for multi-user mixed reality experiences, substantially as shown in and/or described in connection with at least one of the figures, and as set forth more completely in the claims.

DETAILED DESCRIPTION

Figure 1A:
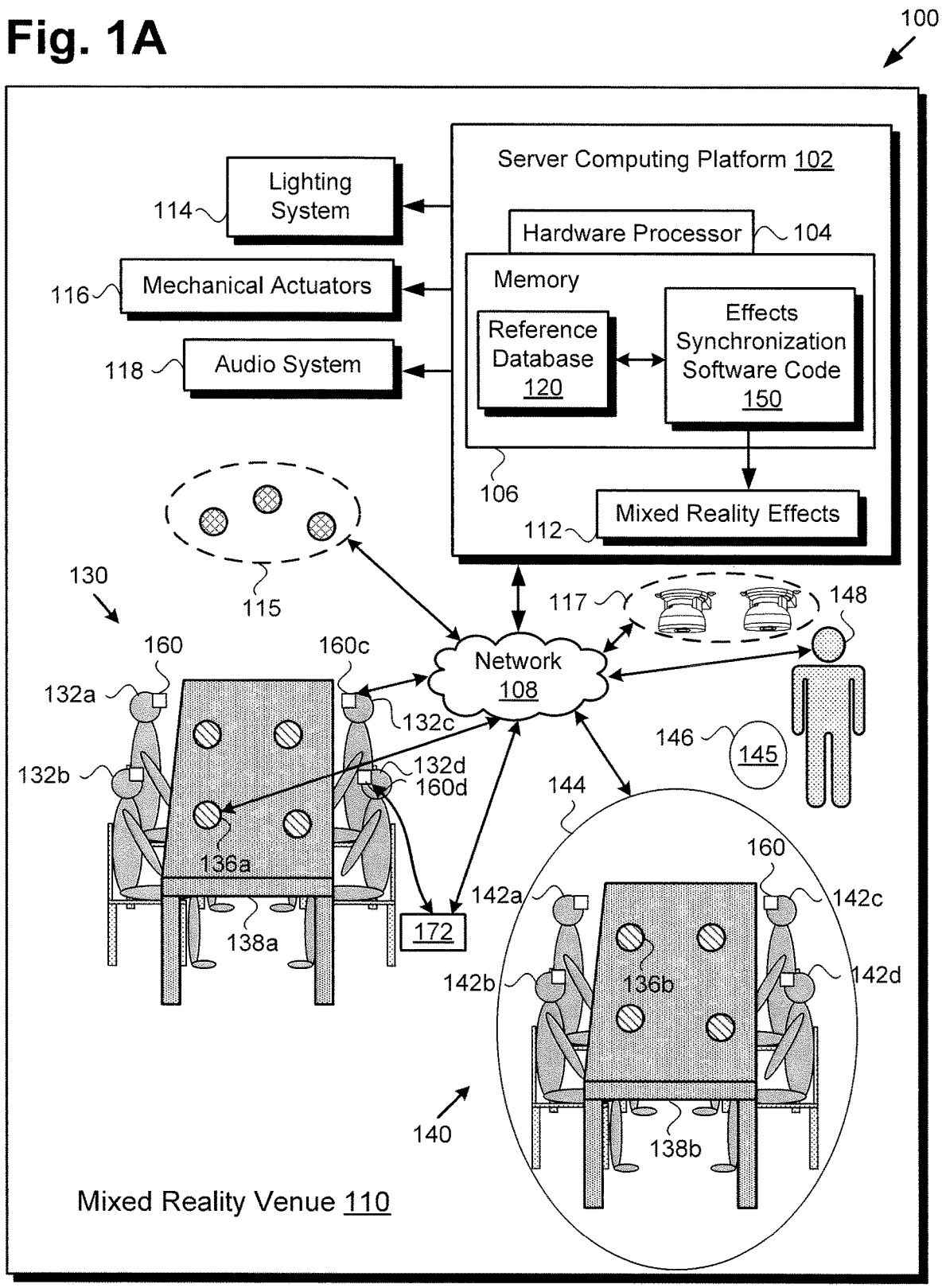
FIG. 1A shows a diagram of an exemplary system for synchronizing effects for multi-user mixed reality experiences, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for synchronizing effects for multi-user mixed reality experiences, where such effects may include augmented reality (AR) virtual effects, haptic effects, prop motion effects, and environmental effects for example. Such effects are used to operate actuating devices within a mixed reality venue. It is noted that, as used herein, the feature "actuating device" and "actuating devices" refer to any one of, or a combination of, devices for rendering the mixed reality effects generated by the systems and according to the methods disclosed herein. For example, actuating devices may include AR wearable devices, such as an AR headset, AR goggles, or AR glasses. As other examples, actuating devices may include haptic or other mechanical actuators within the mixed reality venue, and/or lighting, and/or audio output devices within the mixed reality venue.

It is further noted that, as used herein, "augmented reality" or "AR" refers to the merging of one or more real-world object images and one or more virtual images. Moreover, "AR virtual effect" refers to one or more virtual images in the form of text, such as subtitles, environmental features, such as lighting, color, or structural/architectural features of a user experience venue, or simulations of persons, avatars, characters, caricatures of a person, animals, plants, and living things of various species or varieties, as well as inanimate objects.

It is also noted that, as used herein, "haptic effect" is used in its conventional sense and refers to effects causing a user to experience physical sensations through the application of forces, vibrations, or motions. Moreover, as used herein, "prop motion effect" refers to effects that cause an inanimate physical object to appear to move independently and/or to effects simulating object-to-object interactions. For example, a prop motion effect may cause an object to undergo translational motion across the surface of another object, such as a table, to spin, or to move within a venue while appearing to float in space.

FIG. 1A shows a diagram of an exemplary system for synchronizing effects for multi-user mixed reality experiences, according to one implementation. As shown in FIG. 1A, system 100 can include server computing platform 102 having hardware processor 104, and memory 106 implemented as a non-transitory storage device storing effects synchronization software code 150 and reference database 120 of user profiles, activities that are supported by system 100, and different types of effects for use in generating mixed reality effects 112. Examples of the types of effects stored in reference database 120 include AR virtual effects, haptic effects, prop motion effects, and environmental effects.

As further shown in FIG. 1A, system 100 is implemented within a use environment including communication network 108 and multiple actuating devices including AR wearable devices 160 worn by multiple users 132a, 132b, 132c, and 132d of mixed reality venue 110 (hereinafter "observers 132a-132d"), as well as by users 142a, 142b, 142c, and 142d of mixed reality venue 110 (hereinafter "observers 142a-142d"). As described in greater detail below by reference to FIGS. 2A, 2B, and 3, each of AR wearable devices 160, such as AR wearable device 160c, for example, may include a hardware processor, a memory, a transceiver, a display, and a camera. AR wearable devices 160 are utilized by observers 132a-132d and observers 142a-142d included in one or more activities occurring in mixed reality venue 110.

In addition, FIG. 1A shows lighting system 114, mechanical actuators 116, and audio system 118 of mixed reality venue 110, which are shown to be controlled by server computing platform 102. As shown in FIG. 1A, mixed reality venue 110 further includes venue sensors 115, which may include one or more of pressure, voltage, capacitance, or acoustic sensors, for example, and tracking system 117, which may include multiple optical sensors such as cameras, for example. Also shown in FIG. 1A are objects including tables 138a and 138b and interactive objects 136a and 136b, performer 148, volumetric region 145 having boundary 146, volumetric region 144 defining group 140, group 130, and external computing platform 172 of AR wearable device 160d.

It is noted, that as used herein, the term "observer" is defined to mean a substantially passive observer of an activity, an active participant in the activity, or a leader of an activity, such as a performer. Thus, for the purposes of the present disclosure, the term "observer" describes any one of observers 132a-132d, observers 142a-142d, or performer 148. Moreover, an activity may be an individual activity involving a single observer, or a group activity involving multiple observers.

By way of example, observers 132a-132d included in group 130 are shown to be seated around table 138a and to be interacting with interactive objects 136a. Observers 132a-132d may be involved in a group activity shared by all members of group 130, or may each be involved in an individual activity. By contrast, observers 142a-142d of group 140 defined by volumetric region 144 are seated around table 138b and are shown to be interacting with interactive objects 136b in a shared activity, in which the actions of each of observers 142a-142d, and in some cases performer 148 as well, are experienced by all of observers 142a-142d via actuating devices within mixed reality venue 110, such as AR wearable device 160, for example.

In order to efficiently allocate computational resources, it may be advantageous or desirable to distribute some of the mixed effects synchronization tasks between the computing resources of AR wearable devices 160 and server computing platform 102. For example, in implementations in which observers 132a-132d are each involved in an individual mixed effects experience, synchronization of each of their respective experiences may be performed by the computing resources of their respective AR wearable devices. For example, the mixed effect experience of observer 132d may be synchronized by external computing platform 172 of AR wearable device 160d, while the mixed effects experience of observer 132c may be synchronized by a computing platform of AR wearable device 160c that is fully integrated with AR wearable device 160c.

Allocation of the computing overhead necessary to synchronize the individual mixed effects experiences of observers 132a-132d to the computing resources of AR wearable devices 160 used by observers 132a-132d advantageously makes the computing resources of server computing platform 102 available for use in synchronizing a shared mixed effects experience for observers 142a-142d included in group 140, concurrently. The prioritizing of computational tasks, and the off-loading of some of those tasks to AR wearable devices 160 may be performed by effects synchronization software code 150, executed by hardware processor 104 of server computing platform 102.

With respect to the shared mixed effects experience of observers 142a-142d, it is noted that the locations, as well as the head positions (hereinafter "perspectives") of, and the expressions, gestures, and speech by observers 142a-142d can be detected and interpreted by effects synchronization software code 150, executed by hardware processor 104, based on sensor data received by effects synchronization software code 150 from venue sensors 115 and tracking system 117. In some implementations, for example, sensor data generated by venue sensors 115 and/or tracking system 117 may be received by effects synchronization software code 150, executed by hardware processor 104, either via wired connections of venue sensors 115 and/or tracking system 117 to server computing platform 102, or wirelessly via communication network 108.

It is noted that, in some implementations, objects in mixed reality venue 110, such as tables 138a and 138b and interactive objects 136a and 136b may be "smart" objects configured to exchange data with one another, and/or with server computing platform 102, and/or with actuating devices such as mechanical actuators 116 and AR wearable devices 160. For example, tables 138a and 138b and interactive objects 136a and 136b may send data reporting their respective locations, whether they are being used in an activity, their respective states of charge or power levels, and the like, in order to facilitate the synchronization of simulated object-to-object interactions. In addition, in some implementations, tables 138a and 138b and interactive objects 136a and 136b may receive reporting data from one another and update a real-time state model of mixed reality venue 110.

It is further noted that, although the present application refers to effects synchronization software code 150 as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of server computing platform 102, or to a hardware processor of any of AR wearable devices 160. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is also noted that although FIG. 1A depicts effects synchronization software code 150 and reference database 120 as being co-located in memory 106, that representation is also provided merely as an aid to conceptual clarity. More generally, system 100 may include one or more server computing platforms 102, which may form an interactively linked but distributed system, such as a cloud based system, for instance. As a result, hardware processor 104 and memory 106 may correspond to distributed processor and memory resources within system 100. In one such implementation, system 100 may correspond to one or more web servers, accessible over a packet-switched network such as the Internet, for example. That is to say, in some implementations, communication network 108 may include the Internet. Alternatively, or in addition, in some implementations, communication network 108 may include a local area network (LAN), a wide area network (WAN), or another type of limited distribution or private network.

In some implementations, mixed reality venue 110 may take the form of an indoor venue. Examples of such indoor venues include a cinema, a theater, a concert hall, an enclosed sports arena, or a multi-user gaming venue, to name a few. Alternatively, in some implementations, mixed reality venue 110 may take the form of an outdoor venue. Examples of such outdoor venues include an open air sports arena or stadium, a resort property, and a park, again to name merely a few.

Figure 1B:
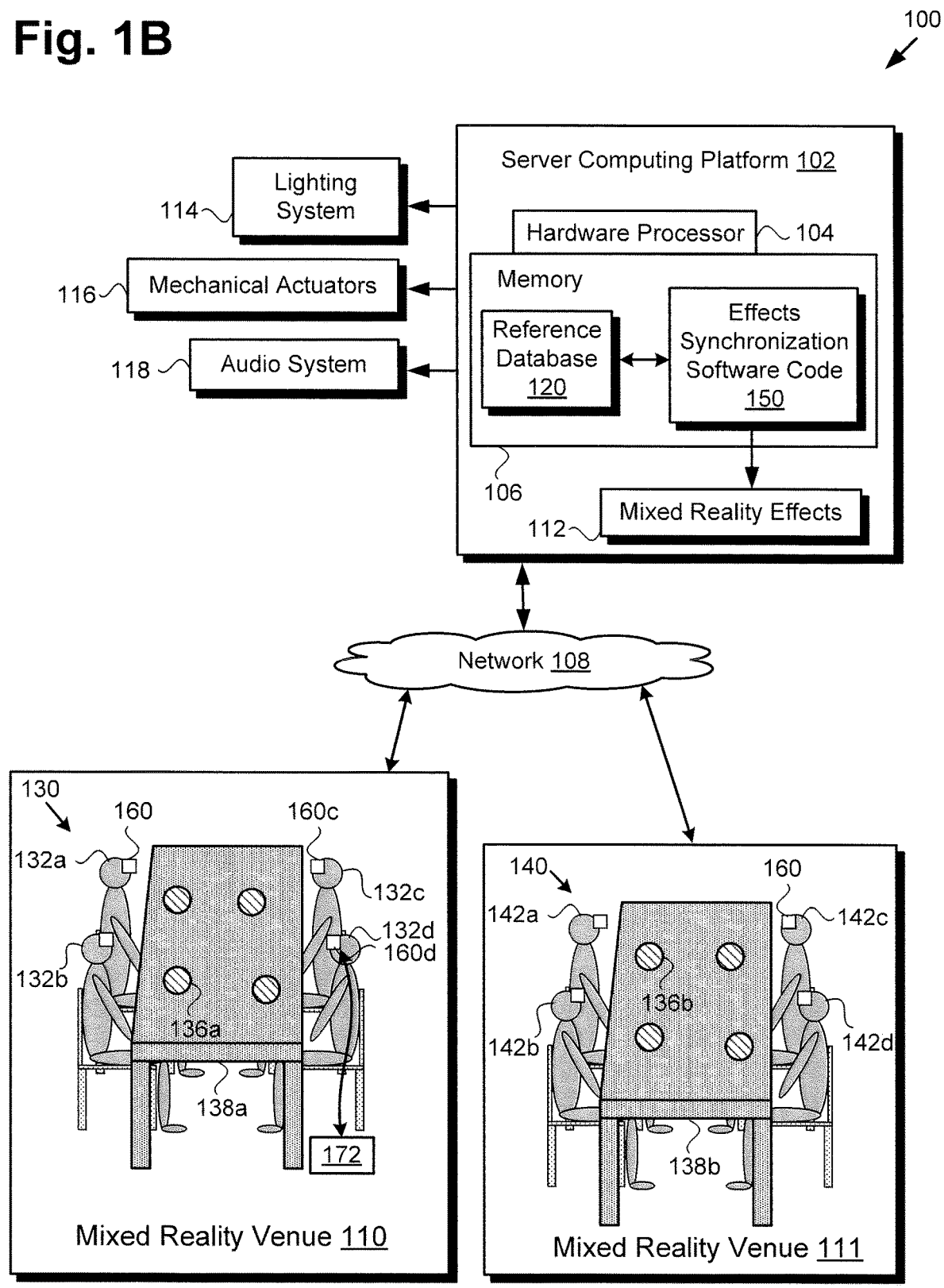
FIG. 1B shows a diagram of an exemplary system for synchronizing effects for multi-user mixed reality experiences, according to another implementation.

FIG. 1B shows a diagram of an exemplary system for synchronizing effects for multi-user mixed reality experiences, according to another implementation. The implementation shown in FIG. 1B differs from that depicted in FIG. 1A in that, according to the implementation shown in FIG. 1B, system 100 synchronizes effects for multi-user mixed reality experiences across multiple mixed reality venues, i.e., mixed reality venue 110 and mixed reality venue 111 remote from mixed reality venue 110.

It is noted that any features identified by reference numbers identical to those shown in FIG. 1A correspond respectively to those previously described features and may share any of the characteristics attributed to those corresponding features above. It is further noted that mixed reality venue 111 corresponds in general to mixed reality venue 110. Consequently, mixed reality venue may share any of the features and functionality attributed to mixed reality venue 110 by the present disclosure, and vice versa. Thus, although not shown in FIG. 1B, mixed reality venue 111 may include features corresponding respectively venue sensors 115, which may include one or more of pressure, voltage, capacitance, or acoustic sensors, for example, and tracking system 117, which may include multiple optical sensors such as cameras, for example.

Figure 2A:
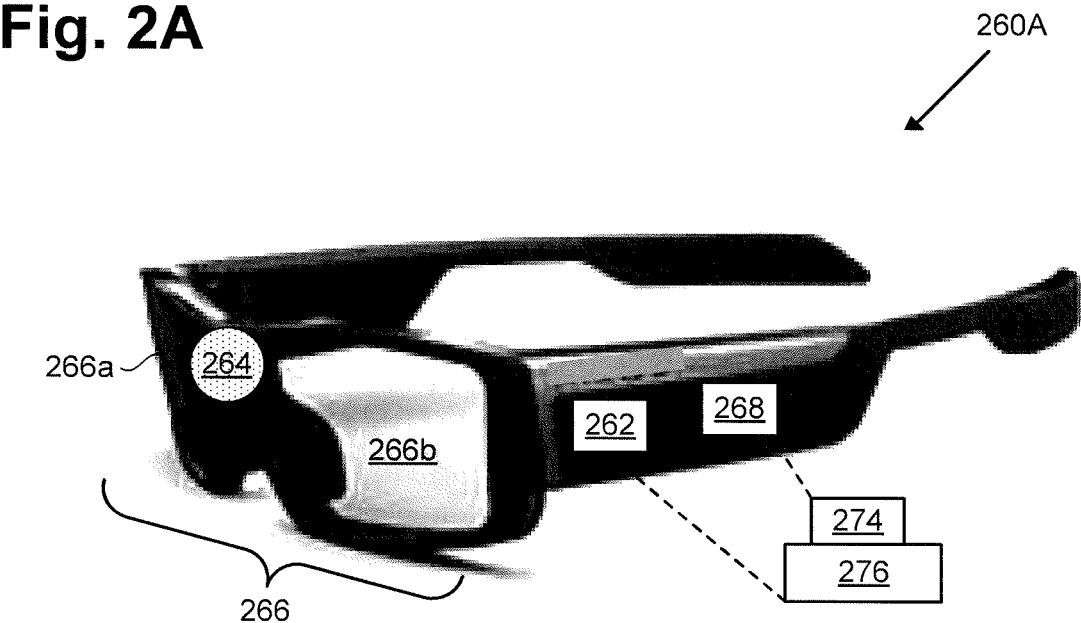
FIG. 2A shows an exemplary actuating device in the form of an augmented reality (AR) wearable device suitable for use in conjunction with the systems of FIGS. 1A and 1B, according to one implementation.
Figure 2B:
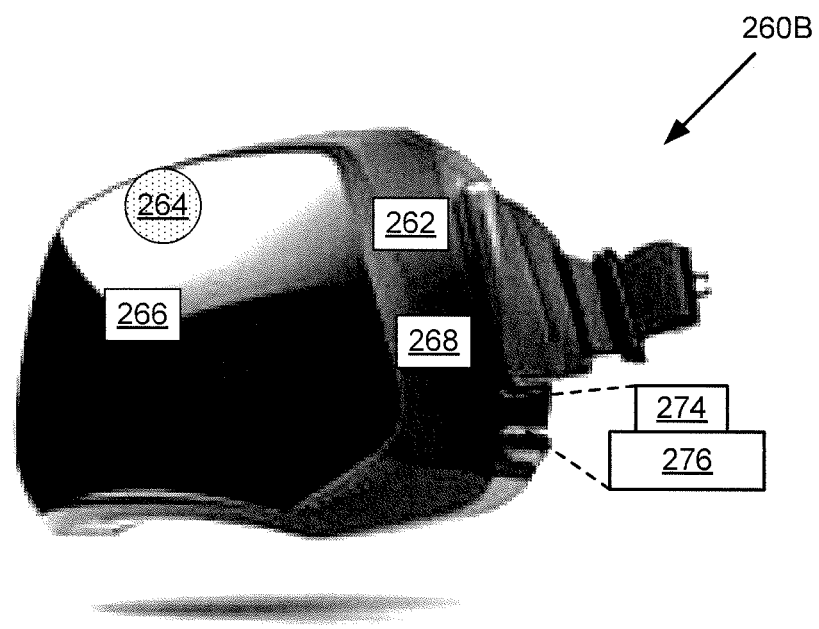
FIG. 2B shows an exemplary actuating device in the form of an AR wearable device suitable for use in conjunction with the systems of FIGS. 1A and B, according to another implementation.

Referring to FIGS. 2A and 2B, those figures show specific exemplary implementations of an AR wearable device suitable for use in conjunction with the systems of FIGS. 1A and 1B. As shown by FIGS. 2A and 2B, respective AR wearable devices 260A and 260B can take a variety of forms. For example, and as shown by FIG. 2A, AR wearable device 260A may be implemented as AR glasses. As further shown by FIG. 2B, in some implementations, AR wearable device 260B may take the form of AR goggles. Moreover, in other implementations, an AR wearable device may take the form of any other type of AR headset.

Each of AR wearable devices 260A and 260B includes transceiver 262, camera 264, and display 266 under the control of hardware processor 274. In addition, each of AR wearable devices 260A and 260B includes memory 276 implemented as a non-transitory storage device, and may further include one or more position/location sensor(s) 268. Either of AR wearable devices 260A and 260B can correspond in general to any of AR wearable devices 160, in FIGS. 1A and 1B. Thus, AR wearable devices 160 may share any of the characteristics attributed to either of AR wearable devices 260A and 260B by the present disclosure, and vice versa. That is to say, although not shown in FIGS. 1A and 1B, AR wearable devices 160 may include features corresponding respectively to transceiver 262, camera 264, display 266, hardware processor 274, and memory 276, and may further include a feature or features corresponding to position/location sensor(s) 268.

Transceiver 262 may be implemented as a wireless communication unit enabling AR wearable devices 160/260A/260B to exchange data with system 100, in FIGS. 1A and 1B, via communication network 108. For example, transceiver 262 may be implemented as a fourth-generation wireless technology (4G) transceiver, or as a 5G wireless transceiver configured to satisfy the IMT-2020 requirements established by the International Telecommunication Union (ITU).

Camera 264 may include a still image camera and/or a video camera. Moreover, in some implementations, camera 264 may correspond to an array of still image and/or video cameras configured to generate a panoramic image of a venue, such as mixed reality venue 110.

As shown in FIGS. 2A and 2B, display 266 may take the form of a single display screen, i.e., see FIG. 2B, or multiple display screens, i.e., display screens 266a and 266b in FIG. 2A. Display 266 including one or more display screens may be implemented as a liquid crystal display (LCD), a light-emitting diode (LED) display, an organic light-emitting diode (OLED) display, or another suitable display screen that performs a physical transformation of signals to light.

Position/location sensor(s) 268 may include one or more accelerometers, and/or gyroscopes, and/or a GPS receiver, and/or a magnetometer, for example. In some implementations, position/location sensor(s) 268 may be implemented as an inertial measurement unit (IMU), as known in the art.

Although FIGS. 2A and 2B show implementations of wearable AR devices 160/260A/260B that include transceiver 262, camera 264, and display 266 under the control of hardware processor 274, as well as memory 276 and optional one or more position/location sensor(s) 268, those implementations are merely exemplary. In some use cases, as shown by AR wearable device 160d, in FIGS. 1A and 1B, it may be advantageous or desirable for AR wearable device 160/260A/260B to be implemented simply as a display, such as display 266, while omitting the other features shown in FIGS. 2A and 2B. In those implementations, the data processing and mixed effects rendering functionality attributed to AR wearable devices 160/260A/260B herein may be performed by external computing platform 172 of AR wearable device 160d, which is shown to be in wired communication with AR wearable device 160d. That is to say, in some implementations, each of AR wearable devices 160/260A/260B may be a display having a wired connection to a respective external computing platform corresponding to external computing platform 172.

Figure 3:
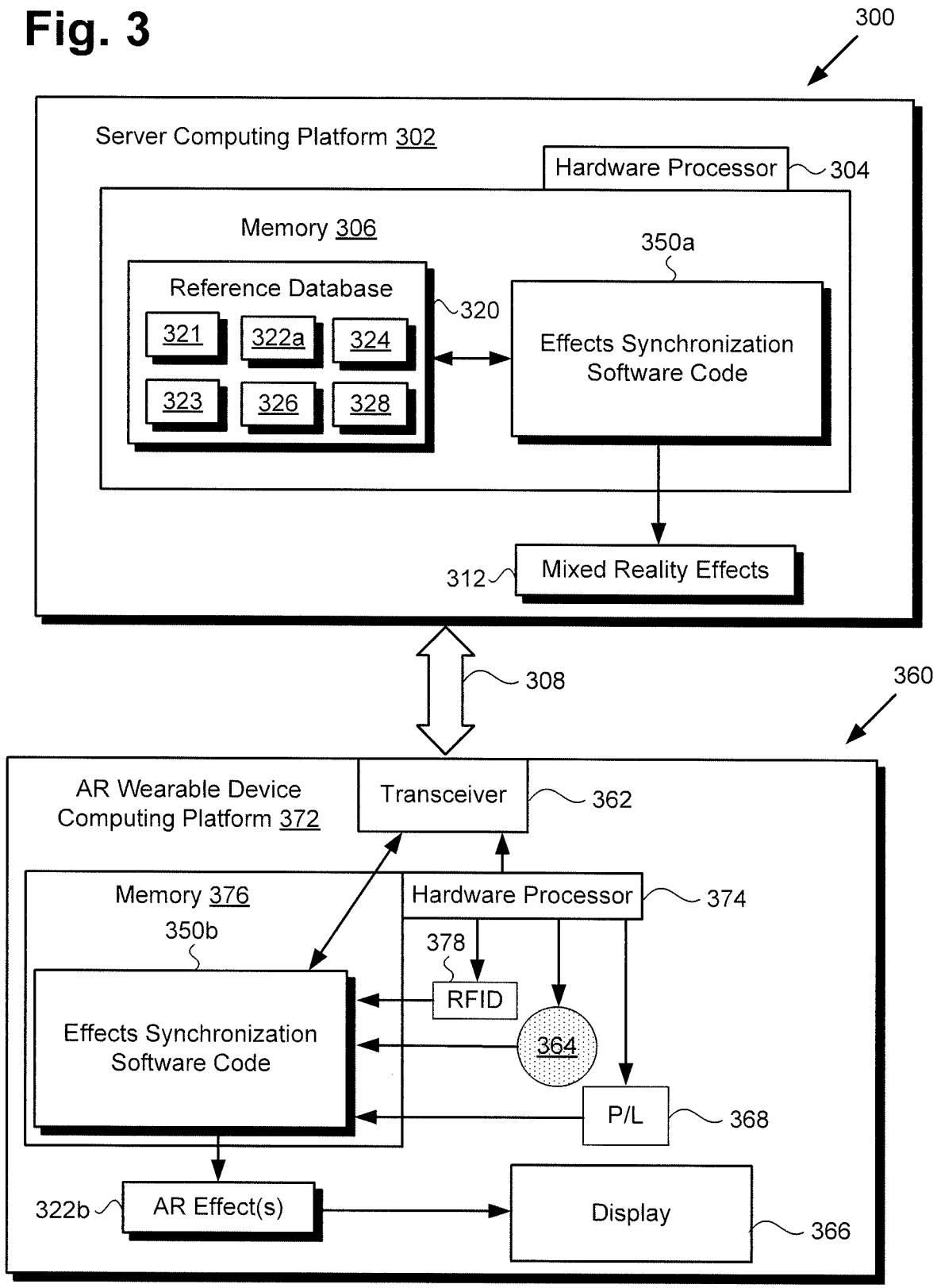
FIG. 3 shows another exemplary implementation of a system for synchronizing effects for multi-user mixed reality experiences, interactively linked to an AR wearable device.

FIG. 3 shows another exemplary implementation of a system for synchronizing effects for multi-user mixed reality experiences, interactively linked to an AR wearable device. According to the exemplary implementation shown in FIG. 3, AR wearable device 360 is interactively connected to server computing platform 302 of system 300 over communication network 308.

As shown in FIG. 3, AR wearable device 360 includes transceiver 362, camera 364, display 366, and position/location sensor(s) 368 corresponding respectively in general to transceiver 262, camera 264, display 266, and position/location sensor(s) 268, in FIGS. 2A and 2B. In other words, transceiver 362, camera 364, display 366, and position/location sensor(s) 368 may share any of the characteristics attributed to respective transceiver 262, camera 264, display 266, and position/location sensor(s) 268 by the present disclosure, and vice versa.

In addition, AR wearable device 360 includes AR device computing platform 372 having hardware processor 374 and memory 376 corresponding respectively in general to hardware processor 274 and memory 276 in FIGS. 2A and 2B. Thus, hardware processor 374 and memory 376 may share any of the characteristics attributed to respective hardware processor 274 and memory 276 by the present disclosure, and vice versa. Also shown in FIG. 3 is optional radio-frequency identification (RFID) reader 378, as well as one or more AR virtual effect(s) 322b generated by system 300 or by AR wearable device 360.

AR wearable device 360 can correspond in general to any of AR wearable devices 160a/260A/260B, in FIGS. 1, 2A, and 2B. Thus, AR wearable devices 160/260A/260B may share any of the characteristics attributed to AR wearable devices 360, and vice versa. It is noted, that in some implementations, as shown by FIGS. 2A and 2B, AR device computing platform 372 may be integrated with AR glasses, AR goggles, or another type of AR headset. However, in other implementations, as shown in FIGS. 1A and 1B, it may be advantageous or desirable to implement AR device computing platform 372 as external AR device computing platform 172/372 having a wired or wireless communication connection to an AR wearable device, such as AR wearable device 160d, for example.

In addition, communication network 308, and system 300 including server computing platform 302 having hardware processor 304 and memory 306 correspond in general to communication network 108, and server computing platform 102 having hardware processor 104 and memory 106, in FIGS. 1A and 1B. Moreover, effects synchronization software code 350a, and reference database 320 including activity library 321, user profiles 323, AR virtual effects 322a, haptic effects 324, prop motion effects 326, and environmental effects 328, in FIG. 3, correspond respectively in general to effects synchronization software code 150, and reference database 120, in FIGS. 1A and 1B. Thus, reference database 320 and effects synchronization software code 350a may share any of the characteristics attributed to reference database 120 and effects synchronization software code 150 by the present disclosure, and vice versa.

Also shown in FIG. 3 are mixed effects 312 output by effects synchronization software code 350a. It is noted that mixed effects 312 correspond in general to mixed effects 112, in FIGS. 1A and 1B. That is to say, mixed effects 312 may share any of the characteristics attributed to mixed effects 112 by the present disclosure, and vice versa. Thus, like mixed effects 112, mixed effects 312 may correspond to any or all of AR virtual effects 322a, haptic effects 324, prop motion effects 326, and environmental effects 328.

According to the exemplary implementation shown in FIG. 3, effects synchronization software code 350b is located in memory 276/376 of AR wearable devices 160/260A/260B/360, having been received from system 100/300 via communication network 108/308. In one implementation, communication network 108/308 mediates transfer of effects synchronization software code 350b over a packet-switched network, for example. Once transferred, for instance by being downloaded over communication network 108/308, effects synchronization software code 350b may be persistently stored in memory 276/376 and may be executed locally on AR wearable devices 160/260A/260B/360 by hardware processor 274/374.

With respect to effects synchronization software code 350b, it is noted that in some implementations, effects synchronization software code 350b may be a thin client application of effects synchronization software code 150/350a. In those implementations, effects synchronization software code 350b may enable AR wearable devices 160/260A/260B/360 to render AR virtual effect(s) 322b on display 266a/266b/266/366. However, in other implementations, effects synchronization software code 350b may include substantially all of the features of effects synchronization software code 150/350a, and may be capable of executing all of the same functionality. That is to say, in some implementations, effects synchronization software code 350b corresponds to effects synchronization software code 150/350a and may share any of the features and perform any of the processes attributed to those corresponding features by the present disclosure. Thus, in some implementations, system 100/300 may be integrated with AR wearable devices 160/260A/260B/360.

Figure 4:
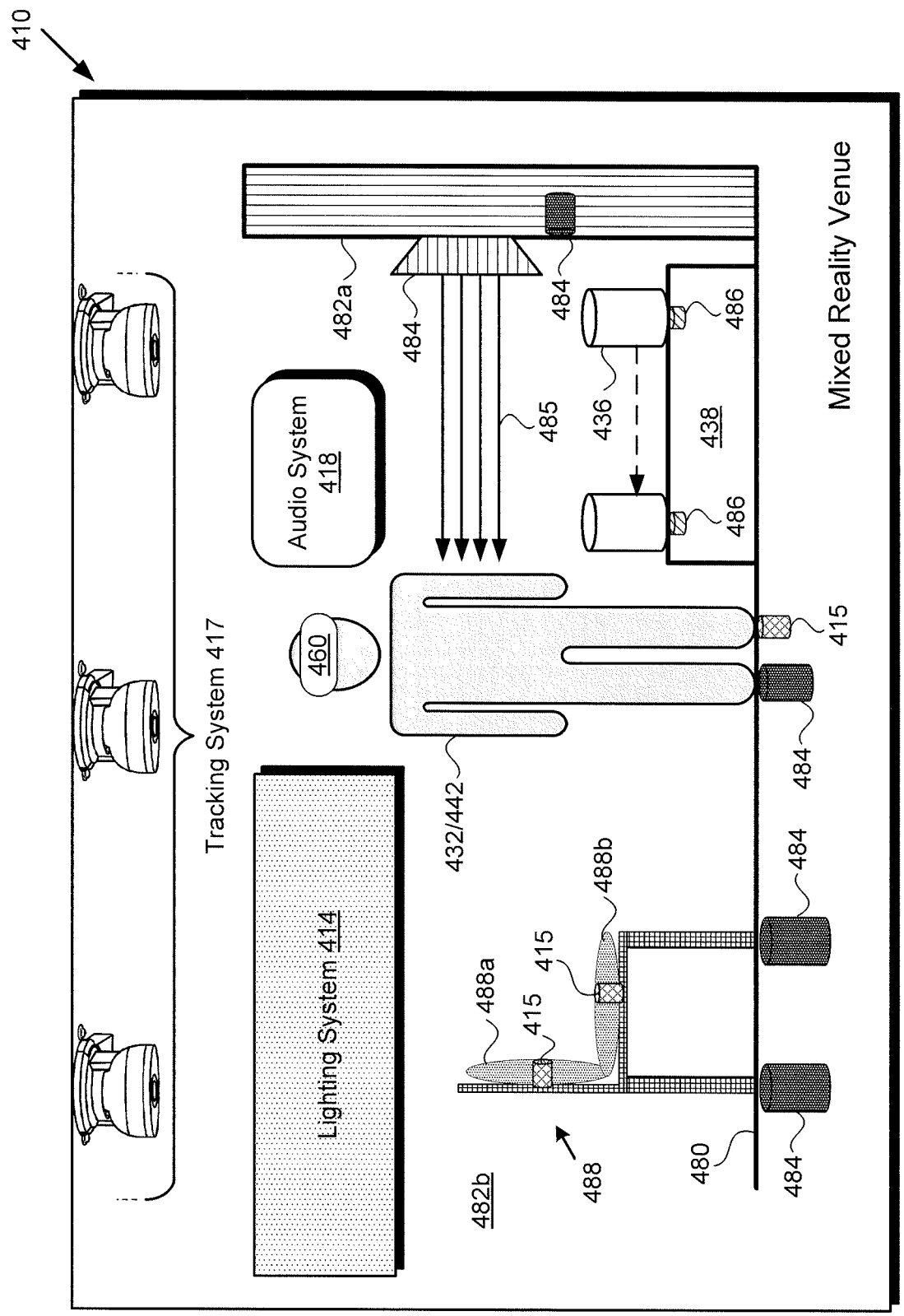
FIG. 4 shows an exemplary mixed reality venue that includes a variety of actuating devices operable to provide a multi-user mixed reality experience, according to one implementation.

FIG. 4 shows exemplary mixed reality venue 410, according to one implementation. As shown in FIG. 4, mixed reality venue 410, which may be an indoor venue, for example, may include floor 480, and exemplary walls 482a and 482b. In addition, mixed reality venue 410 includes, lighting system 414, audio system 418, table 438, interactive object 436, and observer 432/442 corresponding to any of observers 132a-132d or 142a-142d, in FIG. 1A.

As further shown in FIG. 4, mixed reality venue 410 includes venue sensors 415 implemented as exemplary haptic sensors 415, and mechanical actuators 116 (shown in FIG. 1A) in the form of prop motion actuators 486 and haptic actuators 484 in a variety of implementations. Moreover, and as also shown in FIG. 4, mixed reality venue 410 includes seating structure 488, which may be a chair or bench, for example, having seating surfaces 488a and 488b. It is noted that although FIG. 4 shows seating structure 488 as a single structure, that representation is merely provided in the interests of conceptual clarity. In other implementations, mixed reality venue 410 may include multiple seating structures corresponding to seating structure 488. That is to say, mixed reality venue 410 may include one or more benches and/or one or more chairs for the use, comfort, and entertainment of observer(s) 132a-132d/142a-142d/432/442.

According to the exemplary implementation shown in FIG. 4, haptic sensors 415 may be situated in various locations in mixed reality venue 410. For example, haptic sensors 415 may be embedded in or under floor 480 to sense the location of observer(s) 132a-132d/142a-142d/432/442 on floor 480. Alternatively, or in addition, haptic sensors 415 may be implemented in seating surfaces 488a and/or 488b to detect use of seating structure 488 by observer(s) 132a-132d/142a-142d/432/442.

Haptic actuators 484 may have differing sizes, may be implemented so as to have differing orientations, as well as to have different specific functions. For example, one or more of haptic actuators 484 may be implemented in or on wall 482a and/or 482b. Alternatively, or in addition, one or more haptic actuators 484 may be embedded in or under floor 480. For example, haptic actuators 484 embedded in or under floor 480 of mixed reality venue 410 can be utilized to produce haptic effects 324 (shown in FIG. 3) experienced by observer(s) 132a-132d/142a-142d/432/442 as observer(s) 132a-132d/142a-142d/432/442 stands or stand on floor 480. In addition, or alternatively, haptic actuators 484 embedded in or under floor 480 of mixed reality venue 410 can be utilized to produce haptic effects 324 experienced by observer(s) 132a-132d/142a-142d/432/442 while observer(s) 132a-132d/142a-142d/432/442 is/are seated on seating structure 488.

In some implementations, as shown in FIG. 4, haptic actuators 484 may be oriented such that the haptic effects they produce are applied substantially perpendicular to the surfaces or objects in which they are situated. Thus, haptic actuators 484 may produce haptic effects 324 that are perceived by observer(s) 132a-132d/142a-142d/432/442 within mixed reality venue 410 to be produced by seating structure 488, walls 482a and/or 482b, and/or floor 480. The haptic effects produced by haptic actuators 484 may be perceived by observer(s) 132a-132d/142a-142d/432/442 as vibrations, forces, or motions, for example. As a specific example, one or more of haptic actuators 484 mounted on wall 482a may output haptic effect 324 simulating wind 485, for example.

In addition to haptic actuators 484, the actuating devices included in mixed reality venue 410 include AR wearable device 460 and prop motion actuators 486. AR wearable device 460 corresponds in general to AR wearable devices 160/260A/260B/360, in FIGS. 1, 2A, 2B, and 3, and may share any of the characteristics attributed to those corresponding features in the present disclosure. Prop motion actuators 486 may be operable to cause interactive object 436 to perform prop motion effects 326 (shown in FIG. 3) and thus appear to move independently, for example to spin, or to slide across the surface of table 438 under its own power in an object-to-object interaction. It is noted that haptic actuators 484 and prop motion actuators 486 are included among mechanical actuators 116, in FIG. 1A.

Mixed reality venue 410 corresponds in general to mixed reality venue 110/111, in FIGS. 1A and 1B, and those corresponding features may share any of the characteristics attributed to either corresponding feature by the present disclosure. That is to say, although not explicitly shown in FIG. 4, like mixed reality venue 110, in FIGS. 1A and 1B, mixed reality venue 410 includes a server computing platform corresponding to server computing platform 102/302 having hardware processor 104/304, and memory 106/306 storing effects synchronization software code 150/350a. Moreover, like server computing platform 102/302, the server computing platform of mixed reality venue 410 is interactively linked to lighting system 414, audio system 418, tracking system 417, haptic sensors 415, haptic actuators 484, prop motion actuators 486, AR wearable device 460, and objects including table 438 and interactive object 436.

In addition, lighting system 414, audio system 418, table 438, and interactive object 436 correspond respectively in general to lighting system 114, audio system 118, tables 138a and 138b, and interactive objects 136a and 136b, in FIGS. 1A and 1B, and those corresponding features may share any of the characteristics attributed to either corresponding feature by the present disclosure. Moreover, haptic sensors 415 and tracking system 417 correspond respectively in general to venue sensors 115 and tracking system 117, in FIG. 1A. Thus, venue sensors 115 and tracking system 117 may share any of the characteristics attributed to respective haptic sensors 415 and tracking system 417 by the present disclosure, and vice versa.

Lighting system 114/414 may include multiple light sources, and may be configured to provide light of varying intensity and varying colors, for example. For instance, lighting system 114/414 may include spotlights and/or floodlights configured to provide directional lighting that can be turned on or off, or be selectively dimmed and brightened to emphasize one or more objects or features within mixed reality venue 110/111/410, or to draw attention towards or away from actions of performer 148.

Audio system 118/418 may be a venue wide audio system, such as a theater quality Dolby® high definition (HD) surround-sound system, for example. Moreover, audio system 118/418 may include a library of stored audio recordings that can be played back through audio speakers distributed within mixed reality venue 110/111/410. In some implementations, lighting system 114/414 and audio system 118/418 may be synchronized to produce an immersive multi-media environment within mixed reality venue 110/111/410.

Figure 5:
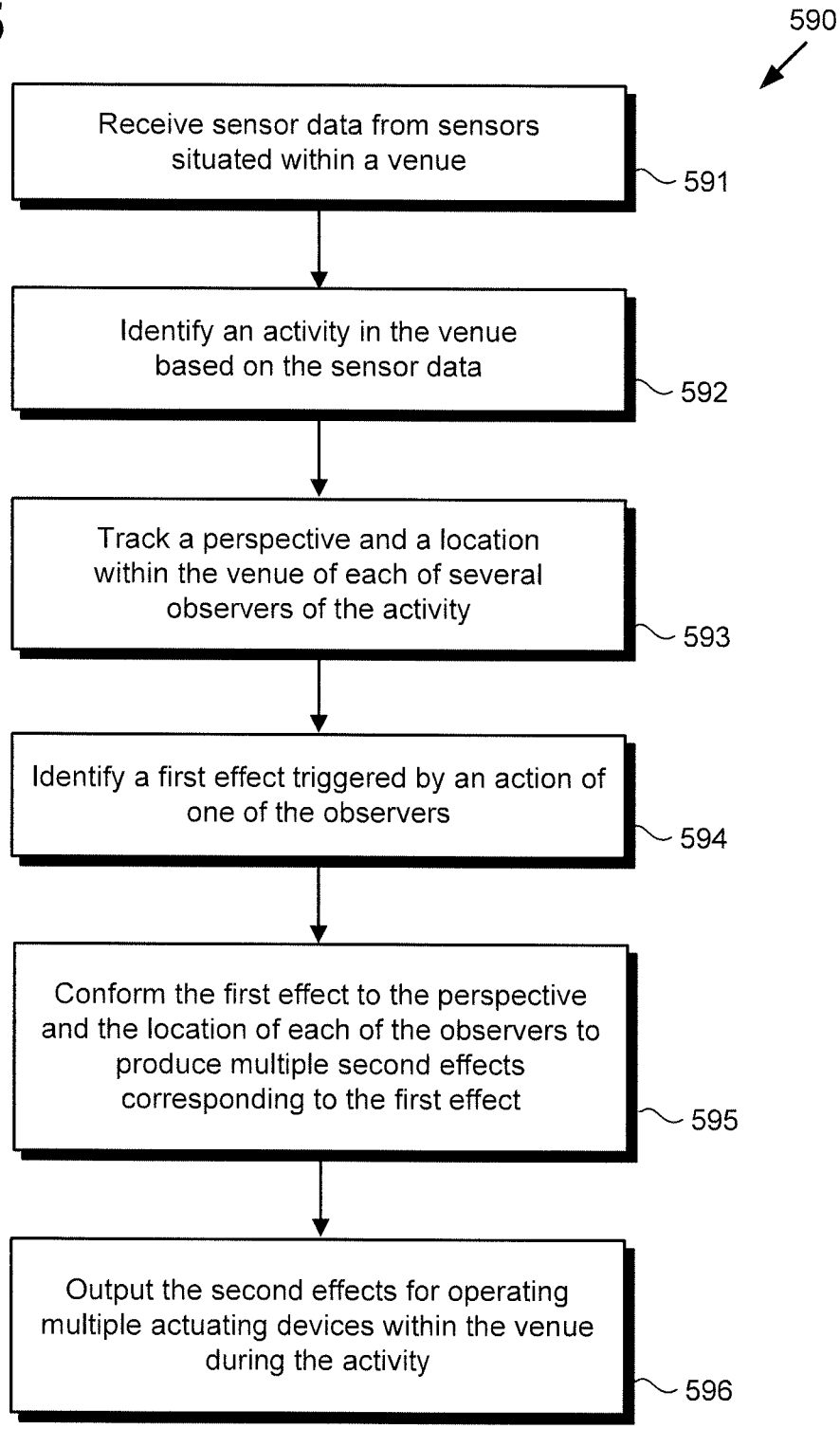
FIG. 5 is a flowchart presenting an exemplary method for use by a system to synchronize effects for multi-user mixed reality experiences.

The functionality of system 100/300 will be further described by reference to FIGS. 5 and 6 in combination with FIGS. 1, 2A, 2B, 3, and 4. FIG. 5 shows flowchart 590 presenting an exemplary method for use by a system to synchronize effects for multi-user mixed reality experiences. With respect to the method outlined in FIG. 5, it is noted that certain details and features have been left out of flowchart 590 in order not to obscure the discussion of the inventive features in the present application.

Figure 6:
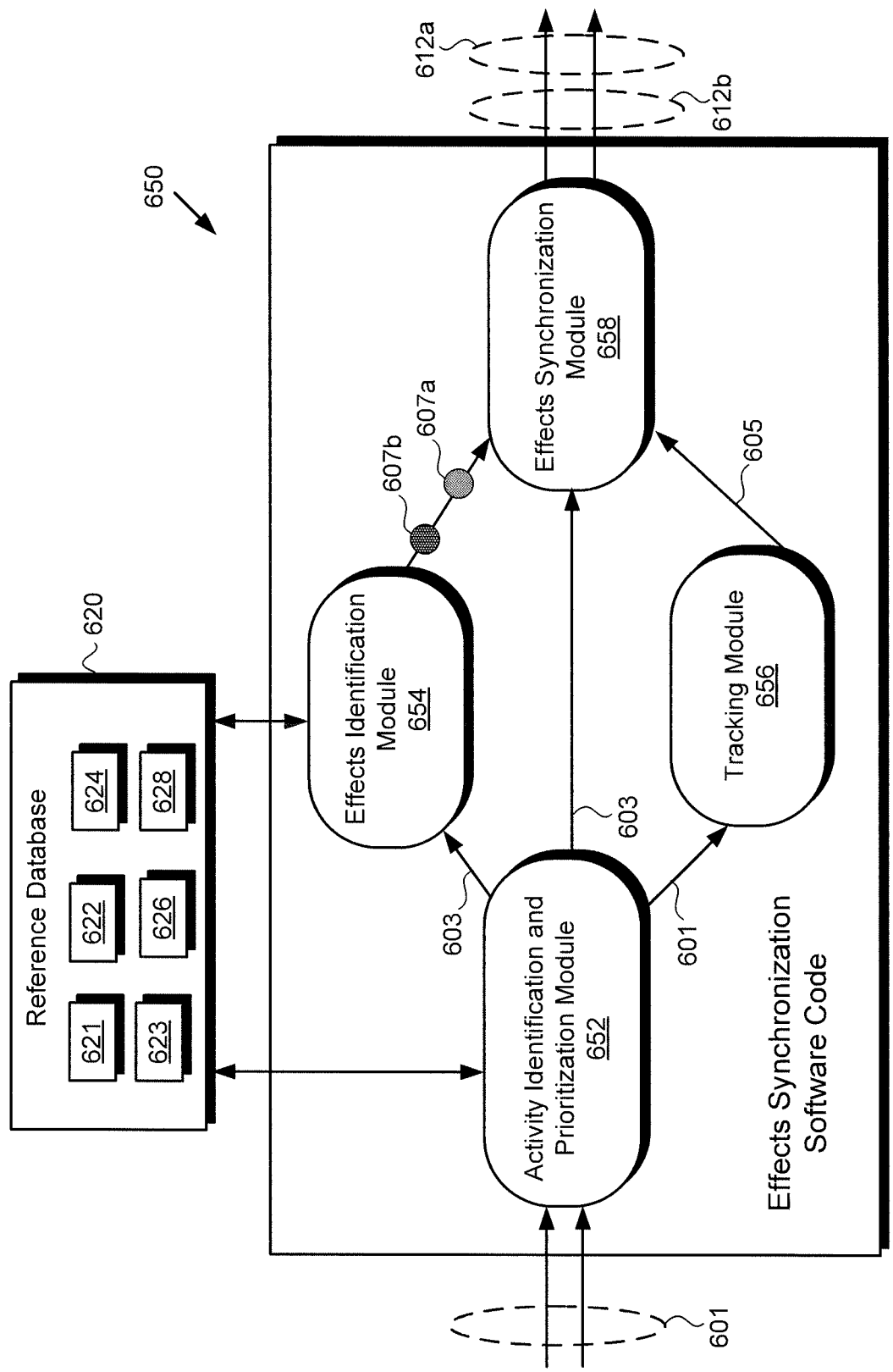
FIG. 6 shows an exemplary diagram of an effects synchronization software code suitable for execution by a hardware processor to synchronize effects for multi-user mixed reality experiences, according to one implementation.

FIG. 6 shows an exemplary diagram of effects synchronization software code 650 suitable for execution by the hardware processors shown in FIGS. 1, 2A, 2B, and 3, according to one implementation. As shown in FIG. 6, effects synchronization software code 650 may include activity identification and prioritization module 652, effects identification module 654, tracking module 656, and effects synchronization module 658. In addition, FIG. 6 shows sensor data 601, activity data 603, tracking data 605, effect 607a, effect 607b, mixed reality effects 612a, and mixed reality effects 612b. Also shown in FIG. 6 is reference database 620 including activity library 621, user profiles 623, AR virtual effects 622, haptic effects 624, prop motion effects 626, and environmental effects 628.

Mixed reality effects 612a and mixed reality effects 612b correspond in general to mixed reality effects 112/312, in FIGS. 1 and 3, and those corresponding features may share any of the characteristics attributed to either feature by the present disclosure. Moreover, effects synchronization software code 650 can correspond in general to effects synchronization software code 150/350a/350b, in FIGS. 1 and 3. That is to say, like effects synchronization software code 650, effects synchronization software code 150/350a/350b may include modules corresponding respectively to activity identification and prioritization module 652, effects identification module 654, tracking module 656, and effects synchronization module 658.

In addition, reference database 620 including activity library 621, user profiles 623, AR virtual effects 622, haptic effects 624, prop motion effects 626, and environmental effects 628, in FIG. 6, corresponds in general to reference database 120/320 including activity library 321, user profiles 323, AR virtual effects 322a, haptic effects 324, prop motion effects 326, and environmental effects 328, in FIGS. 1 and 3. It is noted that in implementations in which effects synchronization software code 350b/650 is stored on memory 276/376 of AR wearable device 160/260A/260B/360/460 and executed locally by hardware processor 274/374, reference database 120/320/620 may be accessible to effects synchronization software code 350b/650 via communication network 108.

Referring to FIG. 5 in combination with FIGS. 1, 2A, 2B, 3, 4, and 6, flowchart 590 begins with receiving sensor data 601 from sensors including venue sensors 115/415 and tracking system 117/417 situated within mixed reality venue 110/111/410 (action 591). As noted above, venue sensors 115/415 may include one or more of haptic sensors, such as pressure sensors, voltage sensors, capacitance sensors, and/or acoustic sensors, for example. In addition, sensors included in tracking system 117/417 may include multiple optical sensors such as still image or video red-green-blue (RGB) cameras or other cameras for capturing light in the visual spectrum, RGB-depth (RGB-D) cameras, or infrared (IR) cameras, for example.

Thus, in some implementations, sensor data 601 may include image data obtained using one or more cameras included in tracking system 117/417. Alternatively, or in addition, in some implementations, sensor data 601 may be received from one or more of camera 364, RFID reader 378, or position/location sensor(s) 368 of AR wearable devices 160/260A/26B/360/460.

In some implementations, sensor data 601 may be transmitted to server computing platform 102/302 via communication network 108. In those implementations sensor data 601 may be received by effects synchronization software code 150/350a/650, and executed by hardware processor 104/304. Alternatively, and as also noted above, in some implementations, effects synchronization software code 350b/650 may be stored locally on memory 276/376 of AR wearable devices 160/260A/260B/360/460. In those implementations, sensor data 601 may be received by effects synchronization software code 350b/650, and executed by hardware processor 274/374.

Flowchart 590 continues with identifying activity data 603 occurring in mixed reality venue 110/111/410 based on sensor data 601 (action 592). Identification of the activity occurring in mixed reality venue 110/111/410 may be performed using sensor data 601 and activity library 321/621 of reference database 120/320/620. For example, an activity description or profile stored in activity library 321/621 may include scripted speech, sound effects, physical postures, and/or lighting effects, to name a few examples. Images, sounds, detected speech, the number of observers 132a-132d/142a-142d/432/442 involved in the activity, as well as participation or non-participation of performer 148 in the activity can be utilized to identify the activity as an activity stored and described in activity library 321/621.

As noted above, in some implementations, sensor data 601 may be received by server computing platform 102/302. In those implementations, an activity in mixed reality venue 110/111/410 may be identified by activity identification and prioritization module 652 of effects synchronization software code 150/350a/650, executed by hardware processor 104/304.

Alternatively and as also noted above, in some implementations, effects synchronization software code 350b/650 may be stored locally on memory 276/376 of AR wearable devices 160/260A/26B/360/460. Thus, in some implementations, the activity in mixed reality venue 110/111/410 may be identified by activity identification and prioritization module 652 of effects synchronization software code 350b/650, executed by hardware processor 274/374.

Flowchart 590 continues with tracking a perspective and a location within mixed reality venue 110/111/410 of each of several observers of the activity (action 593). By way of example, action 593 and subsequent actions outlined in flowchart 590 will be described by reference to a group activity by group 140 including observers 142a-142d, in which performer 148 participates. It is noted that performer 148 is also defined as an "observer" of an activity in which performer 148 participates for the purposes of the present application. In implementations in which the activity includes group 140 and performer 148, action 593 may include identifying the seat at table 138b occupied by each of observers 142a-142d, as well as the head position and viewing angle of each of observers 142a-142d with respect to performer 148, and/or interactive objects 136b, and/or one another.

In implementations in which sensor data 601 is received by server computing platform 102/302 in action 591, the location and perspective of each of observers 142a-142d within mixed reality venue 110/111/410 may be tracked using tracking module 656 of effects synchronization software code 150/350a/650, executed by hardware processor 104/304, and based on sensor data 601. Alternatively, in implementations in which sensor data 601 is received by AR wearable devices 160/260A/260B/360/460, the location and perspective of each of observers 142a-142d within mixed reality venue 110/111/410 may be tracked using tracking module 656 of effects synchronization software code 350b/650, executed by hardware processor 274/374 of AR wearable devices 160/260A/260B/360/460, and based on sensor data 601.

Flowchart 590 continues with identifying effect 607a as a first effect (hereinafter "first effect 607a") triggered by an action of one of observers 142a-142d or performer 148 (action 594). First effect 607a triggered in action 594 may take many different forms, depending on activity data 603, the particular one of observers 142a-142d or performer triggering first effect 607a, and the nature of the trigger itself. For example, where the activity identified in action 592 is an entertainment by performer 148, first effect 607a may be one of AR virtual effects 322a/622, haptic effects 324/624, prop motion effects 326/626, or environmental effects 328/628 triggered by a word or words uttered by performer 148, or by a gesture or facial expression by performer 148. Specifically, for example, dialog by performer 148 may trigger first effect 607a as one or more environmental effects 328/628 in the form of a change in lighting and/or sound produced using respective lighting system 114/414 and audio system 118/418.

As another specific example, a storyline narrated by performer 148 may refer to a violent wind causing a structure occupied by characters in the story to shake. In that use case, a word or words uttered by performer 148, or a gesture by performer 148 may trigger first effect 607a as one of haptic effects 324/624, such as wind 485, or vibrations to be generated by haptic actuators 484 in seating structure 488, floor 480, or walls 482 and 482b of mixed reality venue 110/111/410.

In other implementations, one of AR virtual effects 322a/622 or prop motion effects 326/626 may be identified as first effect 607a. For instance, in cases where the activity identified in action 592 is a multi-player video sports game, first effect 607a may be one of AR virtual effects 322a/622 in the form of an image and/or text identifying athletes, gaming competitors, or additional information about the activity, such as game statistics. In one implementation, such images and/or text may include one or more of a word bubble, thought bubble, or information bubble corresponding to a virtual athlete appearing in the sports game.

As another example, in cases where the activity identified in action 592 is a reenactment or variation of a scene from a cinematic film, one of AR virtual effects 322a/622 triggered by a gesture, facial expression, or speech by performer 148 may depict magic from the film, such as lightning or a virtual energy field projecting from the hands or around the body of performer 148. Alternatively, where performer 148 is demonstrating telekinesis, first effect 607a may be one of prop motion effects 326/626 corresponding to apparently autonomous movement by one or more interactive objects 136b.

As noted above, in some cases, the trigger for first effect 607a may be a gesture, facial expression, or speech by performer 148. Alternatively, the trigger for first effect 607a may be a gesture, facial expression, or speech by any one of observers 142-142d of the activity shared by group 140. Moreover, in some implementations, the trigger for first effect 607a may be penetration of a volumetric region boundary within mixed reality venue 110/111/410 by a hand of performer 148 or one of observers 142a-142d. For example, penetration of boundary 146 of volumetric region 145 by a hand of performer 148 may trigger any one of AR virtual effects 322a/622, haptic effects 324/624, prop motion effects 326/626, or environmental effects 328/628.

In some implementations, first effect 607a triggered by the action of one of observers 142a-142d or performer 148 may be identified using effects identification module 654 of effects synchronization software code 150/350a/650, executed by hardware processor 104/304, and based on activity data 603 output by activity identification and prioritization module 652. Alternatively, first effect 607a triggered by the action of one of observers 142a-142d or performer 148 may be identified using effects identification module 654 of effects synchronization software code 350b/650, executed by hardware processor 274/374 of AR wearable devices 160/260A/260B/360/460, and based on activity data 603 output by activity identification and prioritization module 652.

Flowchart 590 may continue with conforming first effect 607a to the respective perspective and the respective location of each of observers 142a-142d to produce multiple mixed reality effects 112/312/612a (hereinafter "second effects 112/312/612a") corresponding to first effect 607a (action 595). As a specific example of action 595, where an action by performer 148 triggers one of AR virtual effects 322a/622 as first effect 607a, action 595 produces a custom AR virtual effect 322b for each of observers 142a-142d that corresponds to first effect 607a but is appropriately scaled and/or modified to account for their respective locations and perspectives.

That is to say, the one of second effects 112/312/612a produced for observer 142a in action 595 corresponds to first effect 607a while being modified to account for the distance of observer 142a from the location at which the effect occurs, and the unique viewing angle of observer 142a based on a head position of observer 142a and/or a posture, e.g., standing or sitting, of observer 142a. Similarly, the one of second effects 112/312/612a produced for observer 142b in action 595 corresponds to first effect 607a while being modified to account for the distance of observer 142b from the location at which the effect occurs, and the unique viewing angle of observer 142b based on a head position of observer 142b and/or a posture of observer 142b.

As another example, where an action by performer 148 or one of observers 142a-142d triggers one of AR virtual effects 322a/622 as first effect 607a, action 595 produces a custom haptic effect for each of observers 142a-142d that corresponds to first effect 607a but is appropriately modified to account for their respective locations and perspectives. That is to say, the one of second effects 112/312/612a produced for observer 142a in action 595 corresponds to first effect 607a while being amplified or attenuated to account for the distance of observer 142a from the location at which the effect originates, as well as its direction of propagation with respect to observer 142a.

According to some implementations, conforming first effect 607a to the respective perspective and the respective location of each of observers 142a-142d to produce multiple second effects 112/312/612a corresponding to first effect 607a may be performed by effects synchronization software code 150/350a/650, executed by hardware processor 104/304, and using effects synchronization module 658 and tracking data 605 output by tracking module 656. Alternatively, in some implementations, conforming first effect 607a to the respective perspective and the respective location of each of observers 142a-142d to produce multiple second effects 112/312/612a corresponding to first effect 607a may be performed respectively by the one of AR wearable devices 160/260A/260B/360/460 worn by each of observers 142a-142d.

In those latter implementations, action 595 may be performed by effects synchronization software code 350b/650, executed by hardware processor 274/374 of AR wearable devices 160/260A/260B/360, and using event effects synchronization module 658 and tracking data 605 output by tracking module 656.

Exemplary flowchart 590 may conclude with outputting multiple second effects 112/312/612a for operating actuating devices within mixed reality venue 110/111/410 during the activity identified in action 592 (action 596). As noted above, second effects 112/312/612a may correspond to one of AR virtual effects 322a/622, haptic effects 324/624, prop motion effects 326/626, or environmental effects 328/628. Thus, action 596 may result in mixed reality effects being output to operate AR wearable devices 160/260A/260B/360/460, or to operate mechanical actuators 116, such as haptic actuators 484 or prop motion actuators 486, as well as to operate lighting system 114 and/or audio system 118.

Thus, the solutions for synchronizing effects for mixed reality experiences that are disclosed in the present application implement a multi-user communication architecture including self-reporting clients that may include smart objects throughout mixed reality venue 110/111/410, such as tables 128a and 138b and interactive objects 136a and 136b, venue sensors 115/415, tracking system 117/417, and actuating devices including AR wearable devices 160/260A/260B/360/460 and mechanical actuators 116. In addition, in some implementations, the solution disclosed herein includes centralized system 100/300 that ingests sensor data and maintains a real-time state model of mixed reality venue 110/111/410, and that is operable to execute a show script or other predetermined venue activity, and/or to make dynamic execution adjustments to an activity to account for the real-time state description of mixed reality venue 110/111/410.

In some implementations, each client of centralized system 100/300 can be a participating physical object (observer, set-work, prop, robot, haptic actuator, sound, lights, for example). Those clients may be "smart" in that they may listen to network traffic for messages that are relevant to themselves. Each physical object may be equipped with sensors and/or external monitors appropriate to its type, function and role in mixed reality venue 110/111/410. For example, observers 142a-142d might have sensors/monitors to communicate location, pose, gestures, gaze direction, sound utterances, and the like, while a stationary light fixture may simply need sensors/monitors to communicate on/off states.

According to the present inventive principles, physical objects are represented by corresponding software constructs that describe their respective state and relevant parameters in a standardized form. Virtual objects are software generated phenomena, and do not require sensors, although their respective states and relevant parameters may be described in the same standardized software construct form as physical objects.

In some implementations, the real-time state model of mixed reality venue 110/111/410 maintained by system 100/300 may combine sensor data 601 with pre-stored fixed knowledge of the objects in mixed reality venue 110/111/410, such as tables 138a and 138b, seating structure 488, and interactive objects 136a and 136b (e.g., their respective dimensions and shapes). The real-time state model of mixed reality venue 110/111/410 may be as detailed as necessary to support the activities stored in activity library 321/621, but may be limited to some extent by constraints on computational power and communication bandwidth.

In some implementations, centralized support of a particular activity by the computational resources of server computing platform 102/302 and the communication bandwidth resources of communication network 108/308 may be prioritized for group activities (i.e., an activity experienced in common by all members of a defined group, such as group 140). That is to say, in some use cases communication and synchronization of mixed reality effects can be prioritized based on business rules or other predetermined criteria, or may be prioritized dynamically based on information in the state model. As a result, the solutions for synchronizing effects for mixed reality experiences disclosed in the present application can advantageously optimize the quality of prioritized activities rather than naively processing all activity data.

For example, and as described above, in implementations in which observers 132a-132d in group 130 are each involved in an individual activity, rendering of each of their respective experiences may be performed by the computing resources of their respective AR wearable devices. That is to say, the mixed reality experience of observer 132d may be rendered by external AR device computing platform 172/372 of AR wearable device 160d, while the mixed reality experience of observer 132c may be rendered by a computing platform of AR wearable device 160c that is fully integrated with AR wearable device 160c.

In some implementations, first effect 607a identified in action 594 may act as a trigger for another effect, e.g., effect 607b (hereinafter "third effect 607b"). In some of those implementations, hardware processor 104/304 of server computing platform 102/302 may execute effects synchronization software code 150/350a/650 to identify third effect 607b triggered by first effect 607a in a manner analogous to action 594 described above. In addition, hardware processor 104/304 may execute effects synchronization software code 150/350a/650 to conform third effect 607b to the respective perspective and the respective location of each of observers 142a-142d to produce mixed reality effects 112/312/612b (hereinafter "fourth effects 112/312/612b") corresponding to third effect 607b, in a manner analogous to action 595 described above. Hardware processor 104/304 may then execute effects synchronization software code 150/350a/650 to output fourth effects 112/312/612b for operating actuating devices within mixed reality venue 110/111/410, in a manner analogous to action 596 described above.

Alternatively, in some implementations, hardware processors 274/374 of AR wearable devices 160/260A/260B/360 may execute effects synchronization software code 350b/650 to identify third effect 607b triggered by first effect 607a in a manner analogous to action 594 described above. In addition, hardware processors 274/374 may execute effects synchronization software code 350b/650 to conform third effect 607b to the respective perspective and the respective location of each of observers 142a-142d to produce fourth effects 112/312/612b corresponding to third effect 607b, in a manner analogous to action 595 described above. Hardware processor 274/374 may then execute effects synchronization software code 350b/650 to output fourth effects 112/312/612b for operating actuating devices within mixed reality venue 110/111/410, in a manner analogous to action 596 described above.

It is noted, that in some implementations, the actuating devices operated based on fourth effects 112/312/612b may be the same actuating devices operated based on second effects 112/312/612a. However, in other implementations, actuating devices other than those operated based on second effects 112/312/612a may be operated based on fourth effects 112/312/612b. For example, in one implementation, second effects 112/312/612a corresponding to first effect 607a may be AR virtual effects, and fourth effects 112/312/612b corresponding to third effect 607b triggered by first effect 607a may be one of haptic effects or prop motion effects corresponding respectively to AR virtual second effects 112/312/612a.

In some implementations, fourth effects 112/312/612b may be output for operating actuating devices within mixed reality venue 110/111/410 substantially concurrently with operating of other actuating devices based on second effects 112/312/612a. However, in other implementations, fourth effects 112/312/612b may be output for operating actuating devices within mixed reality venue 110/111/410 subsequent to operation of actuating devices based on second effects 112/312/612a.

It is noted that the discussion of flowchart 590 and the analogous actions involving third effect 607b and fourth effects 112/312/612b have focused on a group activity by group 140 including observers 142a-142d. It is further noted that in some of those implementations, second effects 112/312/612a and fourth effects 112/312/612b may be experienced exclusively by the members of group 140, but not by other observers within mixed reality venue 110/111/410, such as observers 132a-132d of group 130. For example, volumetric region 144 defining group 140 in FIG. 1A may be interpreted by system 100/300 as an electronic fence restricting output of second effects 112/312/612a and fourth effects 112/312/612b to only those actuating devices situated within volumetric region 144.

Nevertheless, in some implementations system 100/300 may be designed to support multiple group activities substantially concurrently. For example, where observers 132a-132d of group 130 are mutually experiencing a second group activity different from the group activity experienced by group 140, hardware processor 104/304 of server computing platform 102/302 may execute effects synchronization software code 150/350a/650 to identify the second activity of observers 132a-132d based on sensor data 601, in a manner analogous to action 592 described above. In addition, hardware processor 104/304 may execute effects synchronization software code 150/350a/650 to track a respective perspective and a respective location within mixed reality venue 110/111/410 of each of observers 132a-132d, in a manner analogous to action 593 described above.

In those implementations, hardware processor 104/304 may further execute effects synchronization software code 150/350a/650 to identify another effect (also described herein as a "third effect") 607b triggered by an action of one of observers 132a-132d, in a manner analogous to action 594 described above. Hardware processor 104/304 may also execute effects synchronization software code 150/350a/650 to conform that third effect to the respective perspective and the respective location of each of observers 132*a*-132*d* to produce mixed reality effects 112 for observers 132*a*-132*d* (also described herein as "fourth effects") corresponding to the third effect, in a manner analogous to action 595 described above. Hardware processor 104/304 may then execute effects synchronization software code 150/350*a*/650 to output those fourth effects for operating other actuating devices within mixed reality venue 110/111/410, in a manner analogous to action 596 described above, and may output those fourth effects corresponding to the second activity of observers 132*a*-132*d* substantially concurrently with outputting second effects 112/312/612*a* corresponding to the group activity of observers 142*a*-142*d*.

In addition, in some implementations, system 100/300 may support a group activity experienced by group 140 concurrently with multiple individual activities experienced by each of observers 132*a*-132*d*. For example, in some implementations, each of observers 132*a*-132*d* may subscribe to a different desired broadcast signal. That is to say, within a single large audience of observers within mixed reality venue 110/111/410, different observers may subscribe to different AR virtual effects "channels" delivering content based on their preferred options. For instance, in one implementation, each of observers 132*a*-132*d* may receive AR virtual effects in the form of subtitles rendered in their preferred language, or virtual imagery that is themed based on preferred movie, television, or theme park characters. Such individual preferences of observers 132*a*-132*d* may be stored in their respective user profiles 323/623 accessible to effects synchronization software code 150/350*a*/650 in reference database 120/320/620.

Moreover, in some implementations, system 100/300 may synchronize mixed effects 112/312/612*a*/612*b* to support a group activity experienced by group 130 in mixed reality venue 110 and concurrently by group 140 in mixed reality venue 111 remote from mixed reality venue 110. Thus, in some implementations of the present inventive concepts, each of observers 132*a*-132*d* and observers 142*a*-142*d* may participate in a shared mixed reality experience despite being located in distinct physical venues.

Thus, the solutions for synchronizing effects for multi-user mixed reality experiences that are disclosed in the present application can detect speech and interpret physical motions of performer 148 and/or observers 132*a*-132*d* and 142*a*-142*d* as recognizable gestures. The gestures or speech may trigger an AR virtual effect, haptic effect, prop motion effect, or environmental effect that is visually and timing synchronized with the trigger (e.g., producing a virtual ball flying through the air with altered physics, strange curves, speed changes etc.). In some implementations, an initial visual effect can in turn trigger one or more of a mechanical effect, such as a haptic or prop motion effect, and an environmental effect (e.g., an object-to-object effect in which a ball strikes another object or wall causing vibration and sound effects). Moreover, the present solution for synchronizing effects advantageously enables the concurrent generation of a variety of such effects for multiple users of a mixed reality venue.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform including a hardware processor and a system memory storing a software code;
   a plurality of smart objects each having one or more actuating devices, each of the plurality of smart objects being configured to communicate its state to the computing platform;
   wherein the hardware processor is configured to execute the software code to:
   maintain a real-time state model for the smart objects based on states of the plurality of smart objects communicated by the plurality of smart objects to the computing platform;
   receive sensor data from a plurality of sensors within a venue;
   identify an activity in the venue based on the sensor data;
   track a respective perspective or a respective location within the venue of each of a plurality of observers of the activity;
   identify a first prop motion effect triggered by an action of one of the plurality of observers;
   conform, based on the real-time state model, the first prop motion effect to the respective perspective or the respective location of each of the plurality of observers to produce a plurality of second prop motion effects corresponding to the first prop motion effect; and
   output the plurality of second prop motion effects for operating the one or more actuating devices of each of the plurality of smart objects within the venue during the activity.

2. The system of claim 1, wherein the first prop motion effect is obtained from a reference database of the system.

3. The system of claim 1, wherein the hardware processor is configured to execute the software code to:
   identify a first haptic effect triggered by the action of the one of the plurality of observers;
   conform, based on the real-time state model, the first haptic effect to the respective perspective or the respective location of each of the plurality of observers to produce a plurality of second haptic effects corresponding to the first haptic effect; and
   output the plurality of second haptic effects for operating the one or more actuating devices of each of the plurality of smart objects within the venue during the activity;
   wherein the one or more actuating devices of each of the plurality of smart objects comprise a haptic actuator and a prop motion actuator.

4. The system of claim 1, wherein the action by the one of the plurality of observers that triggers the first prop motion effect comprises a gesture by the one of the plurality of observers.

5. The system of claim 1, wherein the action by the one of the plurality of observers that triggers the first prop motion effect comprises penetration of a volumetric region boundary within the venue by a hand of the one of the plurality of observers.

6. The system of claim 1, wherein the hardware processor is further configured to execute the software code to:
identify a third effect triggered by the first prop motion effect;
conform, based on the real-time state model, the third effect to the respective perspective or the respective location of each of the plurality of observers to produce a plurality of fourth effects corresponding to the third effect; and
output the plurality of fourth effects for operating one of the one or more actuating devices of each of the plurality of smart objects or a plurality of second actuating devices within the venue.

7. The system of claim 6, wherein the plurality of fourth effects are output for operating the one of the one or more actuating devices of each of the plurality of smart objects or the plurality of second actuating devices substantially concurrently with operating the one or more actuating devices of each of the plurality of smart objects based on the plurality of second prop motion effects.

8. The system of claim 6, wherein the plurality of fourth effects are output for operating the one of the one or more actuating devices of each of the plurality of smart objects or the plurality of second actuating devices subsequent to operating the one or more actuating devices of each of the plurality of smart objects based on the plurality of second prop motion effects.

9. The system of claim 6, wherein the plurality of fourth effects comprise AR virtual effects.

10. The system of claim 1, wherein the hardware processor is further configured to execute the software code to:
identify a second activity in the venue based on the sensor data;
track a respective perspective or a respective location within the venue of each of a second plurality of observers of the second activity;
identify a third effect triggered by a second action of one of the second plurality of observers;
conform, based on the real-time state model, the third effect to the respective perspective or the respective location of each of the second plurality of observers to produce a plurality of fourth effects corresponding to the third effect; and
output the plurality of fourth effects for operating a plurality of second actuating devices within the venue substantially concurrently with outputting the plurality of second prop motion effects.

11. A method for use by a system including a computing platform having a hardware processor and a system memory storing a software code, and a plurality of smart objects each having one or more actuating devices, each of the plurality of smart objects being configured to communicate its state to the computing platform, the method comprising:
maintaining, by the software code executed by the hardware processor, a real-time state model for the smart objects based on states of the plurality of smart objects communicated by the plurality of smart objects to the computing platform;
receiving, by the software code executed by the hardware processor, sensor data from a plurality of sensors within a venue;
identifying, by the software code executed by the hardware processor, an activity in the venue based on the sensor data;
tracking, by the software code executed by the hardware processor, a respective perspective or a respective location within the venue of each of a plurality of observers of the activity;
identifying, by the software code executed by the hardware processor, a first prop motion effect triggered by an action of one of the plurality of observers;
conforming, by the software code executed by the hardware processor, based on the real-time state model, the first prop motion effect to the respective perspective or the respective location of each of the plurality of observers to produce a plurality of second prop motion effects corresponding to the first prop motion effect; and
outputting, by the software code executed by the hardware processor, the plurality of second prop motion effects for operating the one or more actuating devices of each of the plurality of smart objects within the venue during the activity.

12. The method of claim 11, further comprising, obtaining, by the software code executed by the hardware processor, the first prop motion effect from a reference database of the system communicatively coupled to the software code.

13. The method of claim 11, further comprising:
identifying, by the software code executed by the hardware processor, a first haptic effect triggered by the action of the one of the plurality of observers;
conforming, by the software code executed by the hardware processor, based on the real-time state model, the first haptic effect to the respective perspective or the respective location of each of the plurality of observers to produce a plurality of second haptic effects corresponding to the first haptic effect; and
outputting, by the software code executed by the hardware processor, the plurality of second haptic effects for operating the one or more actuating devices of each of the plurality of smart objects within the venue during the activity;
wherein the one or more actuating devices of each of the plurality of smart objects comprise a haptic actuator and a prop motion actuator.

14. The method of claim 11, wherein the action by the one of the plurality of observers that triggers the first prop motion effect comprises a gesture by the one of the plurality of observers.

15. The method of claim 11, wherein the action by the one of the plurality of observers that triggers the first prop motion effect comprises penetration of a volumetric region boundary within the venue by a hand of the one of the plurality of observers.

16. The method of claim 11, wherein the method further comprises:
identifying, by the software code executed by the hardware processor, a third effect triggered by the first prop motion effect;
conforming, by the software code executed by the hardware processor, based on the real-time state model, the third effect to the respective perspective or the respective location of each of the plurality of observers to produce a plurality of fourth effects corresponding to the third effect; and
outputting, by the software code executed by the hardware processor, the plurality of fourth effects for operating one of the one or more actuating devices of each of the plurality of smart objects or a plurality of second actuating devices within the venue.

17. The method of claim 16, wherein the plurality of fourth effects are output for operating the one of the one or more actuating devices of each of the plurality of smart objects or the plurality of second actuating devices substantially concurrently with operating the one or more actuating devices of each of the plurality of smart objects based on the plurality of second prop motion effects.

18. The method of claim 16, wherein the plurality of fourth effects are output for operating the one of the one or more actuating devices of each of the plurality of smart objects or the plurality of second actuating devices subsequent to operating the one or more actuating devices of each of the plurality of smart objects based on the plurality of second prop motion effects.

19. The method of claim 16, wherein the plurality of fourth effects comprise AR virtual effects.

20. The method of claim 11, wherein the method further comprises:

identifying, by the software code executed by the hardware processor, a second activity in the venue based on the sensor data;

tracking, by the software code executed by the hardware processor, a respective perspective or a respective location within the venue of each of a second plurality of observers of the second activity;

identifying, by the software code executed by the hardware processor, a third effect triggered by a second action of one of the second plurality of observers;

conforming, by the software code executed by the hardware processor, based on the real-time state model, the third effect to the respective perspective or the respective location of each of the second plurality of observers to produce a plurality of fourth effects corresponding to the third effect; and outputting, by the software code executed by the hardware processor, the plurality of fourth effects for operating a plurality of second actuating devices within the venue substantially concurrently with outputting the plurality of second prop motion effects.

* * * * *